United States Patent

[11] 3,529,527

| [72] | Inventor | Ludwig Leitz |
| | | Wetzlar, Germany |
| [21] | Appl. No. | 686,569 |
| [22] | Filed | Nov. 29, 1967 |
| [45] | Patented | Sept. 22, 1970 |
| [73] | Assignee | Ernst Leitz GmbH |
| | | Wetzlar, Germany |
| [32] | Priority | July 7, 1967 |
| [33] | | Germany |
| [31] | | L 56,946 |

[54] RANGE FINDER DEVICE HAVING LONG BASE LINE FOR SINGLE LENS REFLEX CAMERAS WITH PENTA PRISM
5 Claims, 6 Drawing Figs.

[52] U.S. Cl. .................................................. 95/44, 95/42
[51] Int. Cl. ...................................................... G03b 3/00
[50] Field of Search ........................................ 95/42, 44C

[56] References Cited
UNITED STATES PATENTS
| 2,887,019 | 5/1959 | Dodin ........................... | 95/42 |
| 3,100,430 | 8/1963 | Morelle ......................... | 95/42 |
| 3,218,946 | 11/1965 | Lange ........................... | 95/42 |
| 3,440,942 | 4/1969 | Sauer ............................ | 95/42 |

FOREIGN PATENTS
| 27,273 | 2/1964 | Germany ................. | 95/44(C)UX |

*Primary Examiner*—Norton Ansher
*Assistant Examiner*—Richard M. Sheer
*Attorney*—Krafft and Wells

ABSTRACT: A split-image range finder for a single lens reflex camera where the measured portion of the image is a large aperture portion for more accurate range finding. The penta prism of the camera has two inclined mirror surfaces located adjacent to its central emerging surface so as to reflect a large aperture portion for more accurate range finding. The penta-screen onto a pair of elongated split-image mirrors arranged vertically between the prism and the field lens and laterally outside the image boundary. The split mirror image reflected back into the ocular appears inverted and immediately below the large aperture image portion, thus allowing measurement on an extended base line. A concave mirror may be used in the place of one of the elongated mirrors to erect that image portion, or the mirrors may be replaced by prisms.

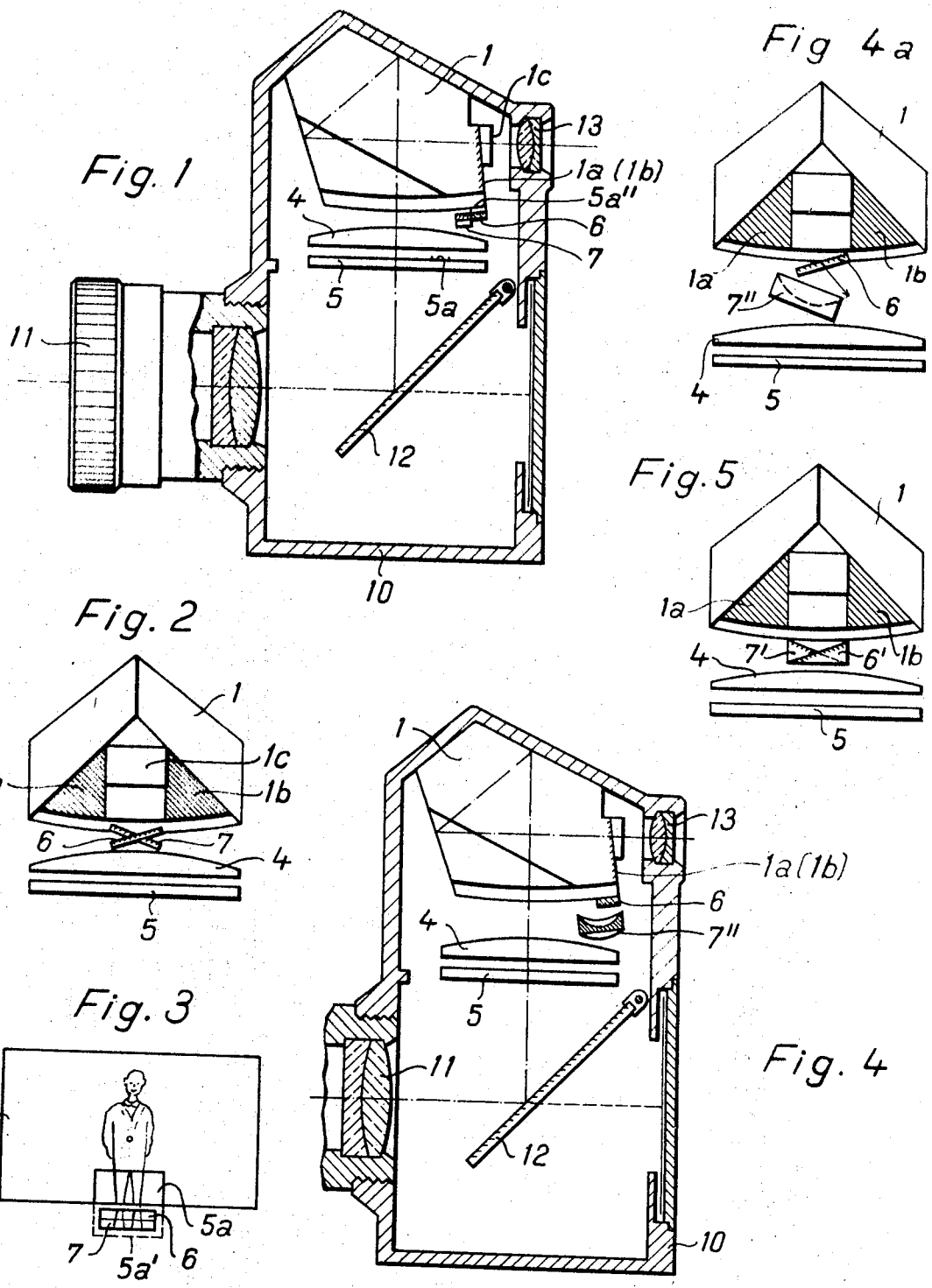

3,529,527

RANGE FINDER DEVICE HAVING LONG BASE LINE FOR SINGLE LENS REFLEX CAMERAS WITH PENTA PRISM

BACKGROUND OF THE INVENTION

1. Field of the Invention

The present invention pertains to range finding devices particularly to range finders for single lens reflex cameras having a penta prism.

2. Description of the Prior Art

It is well known to those skilled in this particular art to dispose deviating wedges in the central portion of the ground glass or focusing screen of a single lens reflex camera in order to achieve split-image range finding. However, it has always been a disadvantage of these devices that the tilt of the wedges cannot be enlarged beyond a base line corresponding to a relative aperture of $f$:5.6. One reason for this is the fact that objectives of great focal length usually have smaller apertures. This has to be taken into account when designing said wedges. On the other hand, there is the location of the exit pupil is normally not exactly defined, which requires a base line disposed well within the exit pupil of the objectives. Otherwise, vignetting of the beams inclined by the deviating wedges would result if the eye is not placed exactly along the optical axis. Consequently, only light beams from an aperture $f$:5.6 or smaller are used for range finding, even if the objective itself is of larger aperture.

SUMMARY OF THE INVENTION

It is therefore an object of the present invention to provide a range finding device for single lens reflex cameras, which also utilizes the light beams from larger apertures if used in connection with objectives of larger relative opening, thereby operating on a considerably enlarged base line.

According to the invention this object is achieved by silvering and inclining two portions of the penta prism rear surface, which portions are adjacent to the central emerging surface of the prism, and by disposing two oblong mirrors inclined to each other in a wedge-like manner beneath said rear surface and spaced from the entering surface of said prism.

As will be explained in more detail hereinafter, the light beams reflected from said first mentioned inclined mirrors are incident on said oblong mirrors and are therefrom reflected into the eyepiece of the camera.

BRIEF DESCRIPTION OF THE DRAWINGS

The invention will be more readily understood from the following description when taken in conjunction with the accompanying drawings, wherein FIG. 1 is a schematic sectional view of a first embodiment of the invention in combination with a single lens reflex camera with penta prism, FIG. 2 is a rear view of the penta prism of FIG. 1 with the oblong mirrors, FIG. 3 represents an image appearing in the ocular of FIG. 1, FIGS. 4 and 4a show a second embodiment of the invention, wherein one of the two oblong mirrors is a concave mirror, FIG. 5 shows schematically a third embodiment of the invention, wherein the oblong mirrors are replaced by prisms.

DESCRIPTION OF THE PREFERRED EMBODIMENTS

Referring now to FIG. 1 the housing 10 of the single lens reflex camera is provided with the interchangeable objective 11. In a known manner the camera also comprises a focusing screen 5 covered by a field lens 4 above which a penta prism 1 is arranged. In the back of the housing 10 the ocular 13 is mounted opposite the central emerging surface 1c of the penta prism 1.

Two portions of the rear prism surface —which portions are located immediately adjacent the central emerging surface 1c as shown in FIG. 2— are slightly inclined and silvered so as to form two mirrors 1a and 1b.

Beneath the entering surface of the penta prism are arranged two oblong mirrors 6 and 7 parallel to the rear edge of said entering surface, said oblong mirrors being inclined to each other in the manner of well known deviating wedges (FIG. 2).

The function of these elements is as follows:

Light rays emitted from a surface portion 5a of the focusing screen 5 are incident on the two mirrors 1a and 1b of the prism rear surface and are therefrom reflected through a surface portion 5a'' of the entering prism surface and projected onto the two mirrors 6 and 7. Thus, an intermediate image of the surface portion 5a is formed on the mirrors 6 and 7, practically at an image scale of 1:1.

The light beams reflected from the mirrors 6 and 7 are directed back into the penta prism where they are reflected in a known manner by the inner penta prism surfaces. The images from the mirrors 6 and 7 are thus reflected into the entrance pupil of the ocular 13.

In other words, it can be said that by means of the objective 11 and the hinged mirror 12 the object is imaged in the plane of the focusing screen 5. Of this image an intermediate image is formed by means of the penta prism 1 in an intermediate image plane (not shown) which coincides with the plane of the entrance pupil of ocular 13. The intermediate image can thus be observed through the ocular, the latter being used as a magnifier. This observation method is common to all single lens reflex cameras having a penta prism.

The novel method of range finding consists in that light beams from larger apertures (portion 5a) are reflected (by mirrors 1a and 1b) so as to form an intermediate object image which is not located in the plane of the ocular entrance pupil but on the mirrors 6 and 7. A further intermediate image is then formed of this intermediate image which is now made to coincide with the plane of the ocular entrance pupil and can thus be observed together with the conventionally formed intermediate object image. Coincidence of this second intermediate image with the plane of the ocular entrance pupil is achieved by the angle of inclination of the wedge-like arranged mirrors. Said angle of inclination is therefore determined by the optical properties of the field lens 4 and of the ocular 13 and has to be designed in accordance with said properties.

It will be readily understood, however, that by utilizing a side portion 5a of the focusing plane 5, beams from a higher aperture are used for range finding, which brings about a considerably enlarged base line for the distance measurement. If, for example, an objective having a relative aperture of $f$:2 is used, the accuracy of measurement is 2.8 times greater than the accuracy achieved by using the well known central deviating wedges where only light rays from an aperture $f$:5.6 are utilized.

According to a further embodiment of the invention as illustrated in FIG. 5 the oblong mirrors 6 and 7 may be replaced by two prisms 6' and 7'. This embodiment therefore resembles more closely the known central deviating wedges and also has all the advantages inherent in the embodiment of FIGS. 1 through 3. However, according to the laws of geometrical optics refracting elements such as prisms in the place of reflecting mirrors must have a slope four times greater than the latter. This might be considered a disadvantage.

The image 5a' is inverted both vertically and horizontally (FIG. 3). However, it still is geometrically related to the image portion viewed at the lower side of the view finder image. Erection of the image next to the view finder image can be achieved by substituting for the mirror 7 an oblong concave mirror 7'' (FIG. 4) having an imaging ratio of 1:1 for the mirror 7 of FIG. 1. The center line of the concave mirror 7'' is located along the adjacent edge of mirror 6. The image then appearing in the ocular corresponds to the image of an inversion range finder; the image portion produced by the mirror 6 appears inverted as before, while the image portion produced by the concave mirror 7'' appears erected, i.e. horizontally and vertically corrected. This feature also produces a twofold increase in the rate of lateral image displacement.

I claim:

1. A range finder in a single lens reflex camera comprising a horizontal focusing screen for receiving an intermediate view finder image, a field lens above said screen, a penta prism above said field lens having an entry surface and a central exit surface and an ocular with an entrance pupil facing said central exit surface, said range finder comprising a split-image range finding device using large aperture image portions having:

a. first mirror means located laterally outside the range finder image field ahead of said ocular; and
   b. second mirror means comprising split-image mirrors located laterally outside the range finder image field in the space defined between said field lens and said prism entry surface whereby a marginal portion of the intermediate image received on said focusing screen is reflected by said first mirror means to form another intermediate image on said second mirror means and that the latter intermediate image is reflected back through said prism and appears in said ocular as a split image indicating the degree of focusing of said marginal image portion on said focusing screen.

2. The device as defined in claim 1, wherein said first mirror means comprises two silvered portions of the rear surface of said penta prism, said silvered portions being located at opposite sides and adjacent to said central exit surface and inclined with respect to the optical axis, said mirrors reflecting a central portion of the bottom margin of said intermediate view finder image.

3. The device as defined in claim 2, wherein said second mirror means comprises two flat elongated mirror sections arranged side-by-side in lengthwise alignment with the bottom edge of the image field and facing said prism entry surface, said mirror sections tilted to opposite directions around a common central transverse surface line, whereby a horizontally and vertically inverted split image appears in said ocular below said marginal portion of the view finder image from which it is derived.

4. The device as defined in claim 2, wherein said second mirror means comprises two wedge-shaped prisms arranged side-by-side defining deviating wedges, whereby a horizontally and vertically inverted split image appears in said ocular below said marginal portion of the view finder image from which it is derived.

5. The device as defined in claim 2, wherein said second mirror means comprises on the one hand, a flat elongated mirror section aligned lengthwise and spaced from the bottom edge of the image field, said mirror section tilted around a horizontal transverse axis, and on the other hand, a concave mirror arranged below said mirror section, said concave mirror having its center located at the point of intersection between the near longitudinal edge of said mirror section and the vertical symmetry plane of the optical system, whereby a first, horizontally and vertically inverted image portion appears in said ocular below said marginal portion of the view finder image from which it is derived, and a second non-inverted image portion appears below said first image portion.